United States Patent [19]

Fukumoto

[11] Patent Number: 4,668,206
[45] Date of Patent: May 26, 1987

[54] TORQUE LIMITING OVERLOAD COUPLING

[76] Inventor: Masao Fukumoto, 4-3, Mukonoso 5-chome, Amagasaki-shi, Hyogo-ken, Japan

[21] Appl. No.: 782,264

[22] Filed: Sep. 30, 1985

[30] Foreign Application Priority Data

Mar. 4, 1985 [JP] Japan .................................. 60-42254

[51] Int. Cl.$^4$ ................................................ F16D 7/06
[52] U.S. Cl. .................................... 464/36; 192/56 R; 464/38
[58] Field of Search ............... 192/56 R, 114; 464/30, 464/35, 36, 37, 38, 39, 42, 43, 44

[56] References Cited

U.S. PATENT DOCUMENTS

| | | | |
|---|---|---|---|
| 3,252,303 | 5/1966 | Weasler et al. | 464/36 |
| 3,985,213 | 10/1976 | Braggins | 192/56 R |
| 4,262,501 | 4/1981 | Vaughn et al. | 464/36 |
| 4,311,224 | 1/1982 | Kato et al. | 192/56 R |
| 4,373,923 | 2/1983 | Kilwin | 464/36 |

FOREIGN PATENT DOCUMENTS

| | | | |
|---|---|---|---|
| 2131122 | 6/1984 | United Kingdom | 464/36 |
| 830042 | 5/1981 | U.S.S.R. | 464/36 |

*Primary Examiner*—Daniel P. Stodola
*Attorney, Agent, or Firm*—Wenderoth, Lind & Ponack

[57] ABSTRACT

A torque limiting overload coupling for preventing an excessive load given to an output element from being reversely transferred to an input element which includes a plurality of paired balls, used as a rotation-transmitting connection between the input and output elements and which are held by the same number of holes extending through a ring plate fastened to the input element, held between a flange on the input element and a slider movable in the axial direction and slidably held on the input element. Each pair of balls has one ball engaged in a hole of the flange and the other ball engaged in a hole of the slider which is biased towards the flange by a compressive force of a spring attached to the rear side of the slider. In a space between the slider and the input element are a pair of parallel, trapezoidal cross-sectioned bars which form a tapered groove therebetween in which an intervener is received, the intervener formed from many sections of a ring having a wedge shaped cross-section. The intervener is pressed against the slider which in turn is pressed against the balls to hold the balls in the holes of the flange to effect transmission of rotation from the input element to the output element. When an excessive load is applied to the output element the balls force the slider away from the flange and thus the intervener between the paired bars and the torque limiter is left in a released condition.

16 Claims, 7 Drawing Figures

TORQUE LIMITING OVERLOAD COUPLING

BACKGROUND OF THE INVENTION

This invention relates to a torque limiter which can be built in a rotation-transmitting coupler and is used to protect an input element against the excessive load by breaking the transmission of rotation to an output element. More particularly, this invention relates to a torque limiter which is able to break the rotation transmission from an input element to an output element by the control of balls.

So far there have been used many types of torque limiters different in structure in order to transmit rotation and protect an input element against an excessive load given to an output element; therefore, it is well known that balls are used to control the breaking and resuming of the transmission.

Conventional torque limiters which employ balls for the above objective are constructed with a ring plate with holes therethrough for holding balls which is fixed to and rotates in association with an output element, a flange provided with tapered holes that allow the balls to enter and exit the tapered holes is united to an input element and a slider to press the balls against the flange across the ring plate is fitted on the input element so as to be movable freely thereon. A pair of tapered bars are put between the slider and the input element; a plurality of balls are placed between the two opposing tapered bars; and a compressed spring is provided for one of the bars. By the construction the balls are pressed between the bars and biased away therefrom. The balls fix the slider in an advanced position when they are out of or not between the bars in order to transmit rotation from the input element to the output element and the balls fix the slider in a retired or retracted position when they are let in or are between the bars to widen them in order to break the rotation transmission.

In a conventional torque limiter like this, the balls are kept in point contact with the tapered bars; thus, an acting load is concentrated on the point of contact; hence there has been a problem that the balls and the tapered bars are liable to wear down by repeatedly applied loads.

Under the circumstances, it is an object of this invention to provide a torque limiter in which the concentration of acting loads due to the point contact is avoided so as to greatly lessen the wearing of the balls and the tapered bars. It is another object of this invention to provide a torque limiter whose life and durability are greatly improved due to the remarkable lessened wearing.

BRIEF DESCRIPTION OF THE DRAWINGS

The above and other objects and features of the invention will appear more fully hereinafter from a consideration of the following description taken in connection with the accompanying drawings wherein one example is illustrated by way of example.

DETAILED DESCRIPTION OF THE PREFERRED EMBODIMENTS

Figure 1:
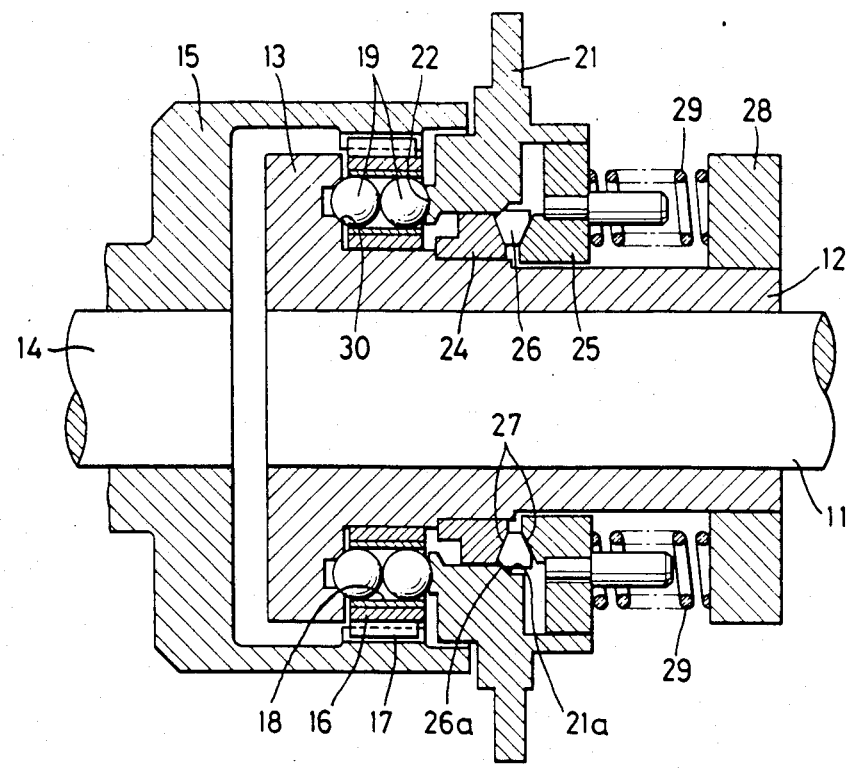
FIG. 1 is a longitudinal cross-sectional view of a torque limiter of this invention.
Figure 2:
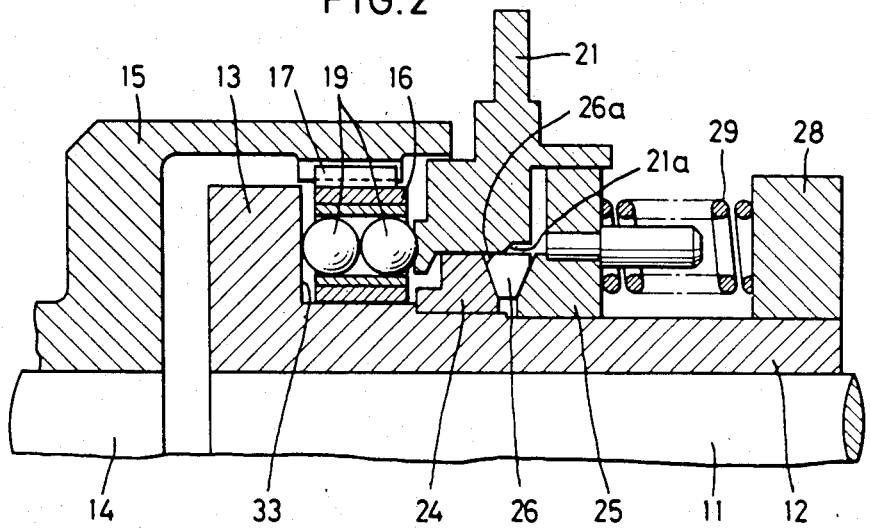
FIG. 2 is a partially cutaway longitudinal cross-sectional view of the above torque limiter which shows a condition when an excessive load is applied thereto.

In FIGS. 1 and 2, the numeral 11 designates an input shaft; the numeral 12 designates an input element fitted on the input shaft; and the numeral 13 designates a flange provided at the front end of the input element. The numeral 14 designates an output shaft; a cylindrical output element 15 fastened to an end of the output shaft 14 covers the flange 13 leaving a small space therebetween. A ring plate 16 having holes for holding balls is loosely fitted on the input element 12 behind or rearward of the flange 13 so as to be rotatable on the input element. An axially extending coupling means 17 composed of a tongue and groove or splined connection couples the outside of the ring plate 16 and the inside of the output element 15 in order for the ring plate and the output element to rotate together.

Near the outer circumference of the ring plate 16 are a plurality of holes 18 which extend in the axial direction. A pair of balls 19 for use in transmitting rotational power are put in each hole respectively. The same number of tapered holes 30 are made on the rear side of the flange 13 so as to receive part of one of the paired balls when the balls are in a first position.

The numeral 21 designates a ring-form slider; part of the other of the paired balls 19 is engaged loosely in a shallow groove 22 having an arcuate cross-section which is made on the front side of the slider.

Figure 3:
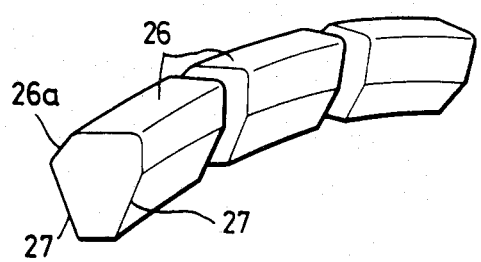
FIG. 3 is a perspective view of an intervener of the above torque limiter.

A tapered groove is formed between the inside of the slider 21 and the outside of the input element 12 by a pair of parallel, trapezoidal cross-sectioned annular bars 24, 25 which are oriented such that the tapered groove is at a right angle to the axial direction. One of the paired bars 25 is slidable in the axial direction for widening and narrowing the tapered groove; an intervener 26 is put between the bars. The intervener 26 is formed as many semi-annular rings as shown in FIG. 3; its radial crosssection tapers on two sides in a wedge shape towards the input shaft. The opposed faces of the bars closely fit both tapered sides of the intervener 26. One of the tapered sides of the intervener 21, brought into contact with the bar 24, is truncated or inclined so as to form a flat annular surface 26a at the corner thereof. The slider 21 has a flat annular surface 21a which is parallel to the surface 26a and is formed on an inner rearwardly facing side of the slider 21. Therefore, when the intervener is pushed radially outwardly by the paired bars 24, 25, the surface 26a on the intervener 26 is brought into close contact with the surface 21a, with the result that the slider 21 is advanced axially and pressed or biased against the balls 19 so as to transmit the rotation of the input shaft 12 to the output shaft 14, when the balls 19 are in a first position as shown in FIG. 1.

Conversely, when the intervener is pushed radially inwardly between the paired bars 24, 25, the surfaces 21a, 26a are brought out of contact and the slider 21 is retracted rearwardly so as to break the rotation transmission when the balls 19 move to a second position out of the holes 30 as shown in FIG. 2.

Figure 4:
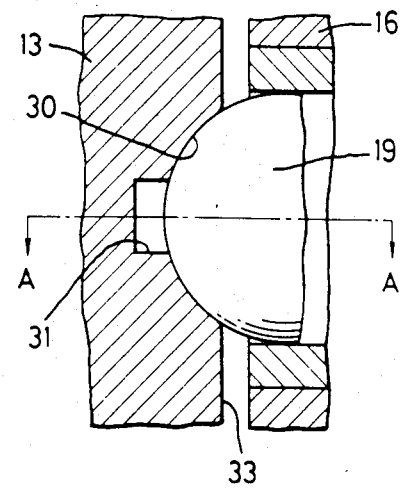
FIG. 4 is an enlarged sectional view of power transmission balls and holes taken in the radial direction.
Figure 5:
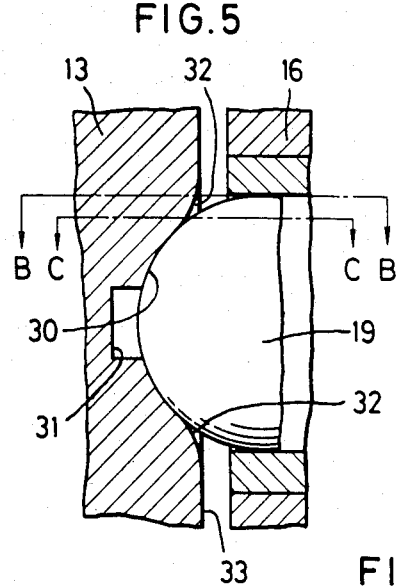
FIG. 5 is a cross-sectional view taken in the line A—A in FIG. 4.
Figure 7:
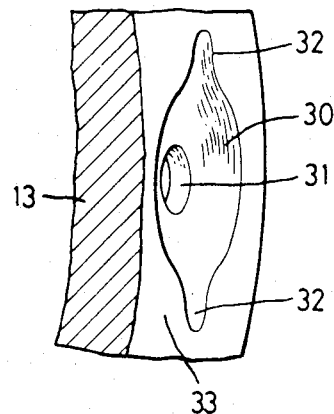
FIG. 7 is a partially cutaway enlarged perspective view of a flange provided with holes on one of its surfaces.
Figure 6:
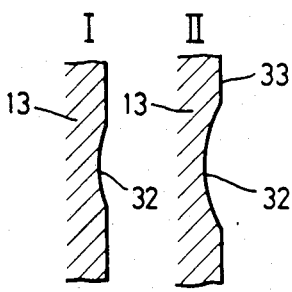
FIGS. 6 I and II are a cross-sectional view taken in the line B—B and C—C in FIG. 5.

An annular ring 28 for retaining spring or elastic means such as compressed springs 29 is fastened to the rear end of the input element 12 for exerting a predetermined force on the movable bar 25; that is, a plurality of springs 29 are compressed between a radially outwardly extending flange on the bar 25 and the ring 28 for urging the movable bar 25 towards the fixed bar 24. The surface of the flange 13 is made spherical for forming each hole 30 in order that part of one of the paired balls may fit therein, as shown in FIGS. 4 and 5. At the bottom of each hole 30 there is formed an undercut in the shape of a straight hole 31. Also, in order to reduce the contact pressure of the balls when they leave the holes 30, a circular ball guide groove 32 is formed having a curvature which is nearly the same as the outside curvature of the balls 19 such that the groove 32 gradually becomes shallow and disappears at the surface 33 of the flange 13, the grooves 32 extending in the circumferential direction in which the balls rotate.

In connection with this, while the example shows the holes 30 having a spherical shape and the ball guide groove 32 on opposite sides of each hole to facilitate entry and exit of the balls from the holes it is also possible to provide the holes with chamfered edges and eliminate the groove entirely.

In the above example, when the input shaft is driven, the ring plate 16, coupled with the flange 13, rotates because the balls 19 held by the ring plate are engaged with the holes 30 of the flange, as shown in FIG. 1; as a result, the output element 15, coupled with the ring plate 16, rotates so as to transmit the rotational power to the output shaft 14. In the meantime, if an excessive load is given to the output element for some reason and makes its rotation difficult, the input element 12 is caused to rotate relative to the output element 15. When this happens, the balls 19 engaged in the holes 30 of the flange 13 are forced out of the holes 30 with the help of the ball guide grooves 32 and are engaged with the flange 13 at positions not provided with holes. As a result the slider is moved rearwardly to a retracted position, as shown in FIG. 2. Furthermore, at this moment, the intervener 26 is pushed radially inward between the paired bars 24, 25 so as to widen the tapered groove because the surface 21a inside the slider 21 presses the surface 26a of the intervener inwardly which moves the bar 25 axially rearwardly. The other bar 24 cannot move forward since there is a step on input element 12 before it, so that only the other bar 25 moves backward and compresses the spring 29.

When the slider 21 is moved further backward, the intervener 26 is kept inwardly of the slider 21 and between the bars 24, 25 because a radially inward surface of the slider 21 is placed on the intervener 26 and presses it radially inwardly. The balls now in the second position are not biased with enough force to return to the holes 30 of the flange 13; thus, the torque limiter is in a released condition and the rotation is not transmitted from the input element to the output element.

I claim:

1. A torque limiting overload coupling for preventing an excessive load from being transferred from an output element to an input element, comprising:
    an input element adapted for connection to an input shaft for rotation of said input element;
    an output element adapted for connection to an output shaft for rotation of the output shaft;
    means for releasably coupling said input element to said output element, said means including a plurality of balls movable from a first position at which transmission of rotation from said input element to said output element is effected to a second position at which transmission of rotation from said input element to said output element is not effected and a slider for pressing said balls into said first position;
    means for biasing said balls in said first position and for allowing said balls to move to said second position when an excessive load is applied to said output element, said means including a pair of bars forming a tapered groove therebetween; at least one of said bars being movable with respect to the other of said bars for widening and narrowing said groove; an intervener having tapered sides received in said groove and being movable radially inwardly and outwardly when said groove is widened and narrowed, respectively, said intervener having a flat annular surface in sliding contact with a flat annular surface of said slider for moving said slider in said axial direction; and spring means which exerts predetermined force on said movable bar for urging said movable bar towards said other bar; whereby said groove is narrowed and said intervener is moved outwardly in a radial direction to move said slider in said axial direction such that said balls are biased in said first position unless an excessive load which exceeds the force exerted by said spring means is applied to said output element which causes said balls to move to said second portion and thereby move said intervener radially inwardly and thus move said movable bar away from said other bar.

2. The torque limiting overload coupling of claim 1, wherein said pair of bars comprise a first bar fixedly mounted on said input element at a position between said output element and said movable bar, each of said bars having a trapezoidal cross-section in said radial direction.

3. The torque limiting overload coupling of claim 2, wherein said bars have an annular cross-section in said axial direction and said intervener comprises a plurality of semi-annular wedge shaped rings which are slidably held in said tapered groove formed between said pair of bars.

4. The torque limiting overload coupling of claim 1, wherein said spring means comprises an annular ring disposed on said input element, said annular ring being spaced from said movable bar and said spring means further comprising a plurality of compressed springs fitted between said annular ring and said movable bar for biasing said movable bar towards said other bar.

5. The torque limiting overload coupling of claim 1, wherein said slider has a radially inward surface which slides axially on a radially outward surface of said fixed bar, said intervener having a radially outward surface on which said radially inward surface of said slider slides when said slider is moved axially away from said flange on said input element when said balls move to said second position at which rotation is not transmitted from said input element to said output element.

6. The torque limiting overload coupling of claim 1, wherein said slider includes a plurality of shallow grooves each at a position corresponding to and facing one of said balls.

7. The torque limiting overload coupling of claim 1, wherein a flange having tapered holes is disposed on said input element, each of said tapered holes in said flange include a guide groove on either side thereof, said guide grooves extending in a circumferential direction around said flange for facilitating entry and exit of said balls from said tapered holes.

8. The torque limiting overload coupling of claim 1, wherein a ring plate is loosely fitted on said input element, said ring plate being coupled to said output element and having a plurality of holes axially therethrough with two balls being held in each of said holes in said ring plate.

9. A torque limiting overload coupling, comprising:
an input element adapted for connection to an input shaft for rotation of said input element;
an output element adapted for connection to an output shaft for rotation of the output shaft;
a ring plate loosely fitted on said input element, said ring plate having a plurality of holes therethrough which extend in an axial direction, and said ring plate being coupled to said output element for rotation therewith;
a plurality of balls, at least one of said balls held in each of said holes;
a flange extending outwardly from said input element on one slide of said ring plate and having tapered holes at positions corresponding to and facing said holes in said ring plate, said tapered holes being sized to receive only part of said balls;
a slider movably mounted on said input element on the other side of said ring plate, said slider being movable in said axial direction and having means thereon for pressing each of said balls towards said flange; and
means for biasing said balls with a predetermined force in a first position in contact with said tapered holes in said flange for transmitting rotation from said input element to said output element and for preventing said biasing of said balls in said first position when a load is applied to said output element which exceeds said predetermined force, said means comprising a pair of bars disposed on said input element, said pair of bars forming a tapered groove therebetween, one of said bars being movable with respect to the other of said bars for widening and narrowing said tapered groove; an intervener having tapered sides received in said groove and being movable radially inwardly and outwardly when said groove is widened and narrowed, respectively, said intervener having an inclined surface in sliding contact with an inclined surface of said slider for moving said slider in said axial direction; and spring means which exerts said predetermined force on said movable bar for urging said movable bar towards said other bar; whereby said groove is narrowed and said intervener is moved outwardly in a radial direction to move said slider in said axial direction such that said balls are biased in said first position unless an excessive load which exceeds the force exerted by said spring means is applied to said output element which causes said balls to move to a second position at which rotation is not transmitted from said input element to said output element thereby moving said slider axially which causes said intervener to move radially inwardly and thus move said movable bar away from said other bar.

10. The torque limiting overload coupling of claim 9, wherein said pair of bars comprise a first bar fixedly mounted on said input element at a position between said ring plate and said movable bar, each of said bars having a trapezoidal cross-section in said radial direction.

11. The torque limiting overload coupling of claim 10, wherein said bars are annular in cross-section in said axial direction and said intervener comprises a plurality of semi-annular wedge shaped rings slidably held in said tapered groove formed between said pair of bars.

12. The torque limiting overload coupling of claim 9, wherein said spring means comprises an annular ring on said input element spaced from said movable bar and a plurality of compressed springs fitted between said annular ring and said movable bar for biasing said movable bar towards said other bar.

13. The torque limiting overload coupling of claim 9, wherein said slider has a radially inward surface which slides axially on a radially outward surface of said fixed bar, said intervener having a radially outward surface on which said radially inward surface of said slider slides when said slider is moved axially away from said flange on said input element when said balls move to said second position at which rotation is not transmitted from said input element to said output element.

14. The torque limiting overload coupling of claim 9, wherein said slider includes a plurality of shallow grooves each of which is at a position corresponding to and facing one of said balls.

15. The torque limiting overload coupling of claim 9, wherein each of said tapered holes in said flange include a guide groove on either side thereof, said guide grooves extending in a circumferential direction around said flange for facilitating entry and exit of said balls from said tapered holes.

16. The torque limiting overload coupling of claim 9, wherein two balls are held in each of said holes in said ring plate.

* * * * *